(12) United States Patent
Golikov et al.

(10) Patent No.: US 11,734,230 B2
(45) Date of Patent: Aug. 22, 2023

(54) TRAFFIC REDUNDANCY DEDUPLICATION FOR BLOCKCHAIN RECOVERY

(71) Applicant: VMware, Inc., Palo Alto, CA (US)

(72) Inventors: Igor Golikov, Tel Aviv (IL); Alex Markuze, Tel Aviv (IL); Avishay Yanai, Tel Aviv (IL); Guy Gueta, Tel Aviv (IL); Israel Cidon, San Francisco, CA (US); Eyal Zohar, Tel Aviv (IL)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/562,684

(22) Filed: Dec. 27, 2021

(65) Prior Publication Data

US 2023/0205738 A1    Jun. 29, 2023

(51) Int. Cl.
  *G06F 16/17*  (2019.01)
  *G06F 16/174*  (2019.01)

(52) U.S. Cl.
  CPC ................. *G06F 16/1752* (2019.01)

(58) Field of Classification Search
  CPC .................................. G06F 16/1752
  See application file for complete search history.

(56) References Cited

U.S. PATENT DOCUMENTS

| 2013/0346374 | A1* | 12/2013 | Wolf | G06F 16/1752 |
| | | | | 707/685 |
| 2017/0116218 | A1* | 4/2017 | Sung | G06F 16/1752 |

OTHER PUBLICATIONS

Miguel Castro and Barbara Liskov, "Practical Byzantine Fault Tolerance", Laboratory for Computer Science, Massachusetts Institute of Technology, Appears in the Proceedings of the Third Symposium on Operating Systems Design and Implementation, Feb. 1999, 14 pages.

Guy Golan et al., "SBFT: A Scalable and Decentralized Trust Infrastructure", arXiv:1804.01626v3, Jan. 2, 2019, 14 pages.

"International Search Report and Written Opinion dated Mar. 22, 2023", International Application No. PCT/US2022/050805 filed Nov. 22, 2022; 10 pages.

* cited by examiner

*Primary Examiner* — Baoquoc N To (57) ABSTRACT

In some embodiments, a method receives data for a block in a blockchain during a recovery process in which a recovering replica is recovering the block for a first instance of the blockchain being maintained by the recovering replica. The block is received from a second instance of the blockchain being maintained by a source replica. The method splits the data for the block into a plurality of chunks. Each chunk includes a portion of the data for the block; It is determined whether the recovering replica can recover a chunk in the plurality of chunks using a representation of the chunk. In response to determining that the recovering replica can recover the chunk, sending the representation of the chunk to the recovering replica. In response to determining that the recovering replica cannot recover the chunk, sending the data for the chunk to the recovering replica.

21 Claims, 7 Drawing Sheets

TRAFFIC REDUNDANCY DEDUPLICATION FOR BLOCKCHAIN RECOVERY

BACKGROUND

State machine regular replication (SMR) is used for building a fault-tolerant distributed computing system where the system provides a service whose operations and state are replicated across multiple nodes, known as replicas. The service may be implemented in the blockchain space (e.g., using a ledger). The blockchain may be distributive in nature, where each replica may store a copy of the blockchain. When the state of a blockchain for a replica needs to be recovered, the blocks of the blockchain may be downloaded from another replica. However, the download process may be very slow. For example, each block would need to be downloaded from the blockchain, and then the blocks validity needs to be verified, the transactions found in the block executed, and the block saved locally. Because of this, syncing a full blockchain may take a long period of time, such as days, depending on the amount of data in the blockchain. Also, the performance of the backup process may depend heavily on the computing power, storage, and network speed of the replicas.

In some blockchains, such as for financial technology (FinTech) applications, the daily growth of the blockchain may be large, such as hundreds of gigabytes. If even one replica (e.g., a recovering replica) needs to recover even part of this history, the recovery process may introduce large amounts of traffic between the recovering replica and a source replica, which is providing the missing data. In some cases, the blockchain, such as an enterprise blockchain, will have replicas running in different sites, such as at different cloud providers. The different sites may communicate over a public network, such as the Internet. Communication between sites may be slower than communications intra-site. Also, when using public cloud providers, the public cloud providers charge a fee for data transfer. The fee for intra-site transfers (e.g., intra-datacenter) and transferring data out of the datacenter is different. For example, fees for transferring data to a different site may be higher than transferring data within the same region or cloud provider.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In the accompanying drawings.

DETAILED DESCRIPTION

In the following description, for purposes of explanation, numerous examples and specific details are set forth to provide a thorough understanding of embodiments of the present disclosure. Some embodiments as expressed in the claims may include some or all the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should be construed as inclusive of the well understood mechanism.

In some embodiments, replicas may be performing a recovery process to recover data in a blockchain. In the following discussion, a replica that is recovering data from the blockchain is referred to as a "recovering replica" and a replica that is providing the data to the recovering replica is referred to as a "source replica". That is, in the recovery process, the blocks from a blockchain may be transferred from the source replica to the recovering replica. As discussed in the Background, the recovery process may involve transfer of a large amount of data from a large number of blocks. The transfer may result in network degradation (e.g., reduced bandwidth). Also, charges for the transfer may be paid by an enterprise, and a high cost may be incurred especially when transferring data across sites, such as different data centers.

A blockchain may include a large amount of redundant data where a current block may only include a small change from a previous block. For example, the current block may include one small change in a transaction, such as a key value pair, compared to the previous block. Also, the same block may include portions that are redundant. Accordingly, there may be a lot of redundant traffic between the source replica and the recovering replica. This may cause the same data to be transferred across the network multiple times, and all the transfers of the same data may also be charged. In some cases, the recovering replica may attempt to select the source replica that is closest to it, but there may be situations when all replicas in a given site may be down or may be unavailable to perform the recovery process. In this case, the recovering replica may have to retrieve blocks from a source replica in another site over a public network, such as the Internet.

Some embodiments use a replica, which is referred to as a traffic redundancy elimination (TRE) replica, during the recovery process to reduce the amount of data that is sent. For discussion purposes, replicas that participate in the consensus process to commit, execute, and add blocks to the blockchain may be referred to as "regular replicas". To distinguish between regular replicas for discussion purposes, the TRE replica may be referred to as a "TRE". In some embodiments, the TRE may only participate in the recovery process for the blockchain and not participate in the consensus process to reach consensus on committing, executing transaction requests from clients, and writing new blocks to the blockchain and may not be part of a replica. However, in some cases, the TRE may be part of a regular replica that participates in the consensus process.

TREs may be deployed in sites where regular replicas are deployed. TREs participate in the recovery process. For example, traffic between the source replica and the recovering replica may pass through the TRE. Then, the TRE may perform an optimization, such as the TRE may deduplicate the data that is sent between the source replica and the recovering replica. For example, the TRE may split a block into chunks. Then, the TRE determines whether a chunk can be retrieved by the recovering replica without sending the actual data for the chunk. For example, the chunk may have already been sent to the recovering replica and can be retrieved from a representation of the chunk, such as a hash of the chunk (e.g., a reduced-size version of the chunk). If the chunk is retrievable, the TRE may send the representation of the chunk. If the chunk cannot be retrieved using the representation, then the TRE may send the actual data for the chunk from the blockchain to the recovering replica. By sending the representation of the chunk, the recovering replica may look up the data for the chunk using the representation. Once receiving all the chunks via the representations of the chunks and/or the data for the chunks, the recovering replica may recover the block.

The use of the TRE reduces the traffic between the source replica and the recovering replica because sending the representations of the chunks sends less data. Also, sending less data may reduce the cost of sending the data when an enterprise is charged by the amount of data that is sent. Further, using chunks may allow the identification of portions of blocks that are redundant between the two blocks even when the two blocks are not exactly the same.

System Overview

Figure 1A:
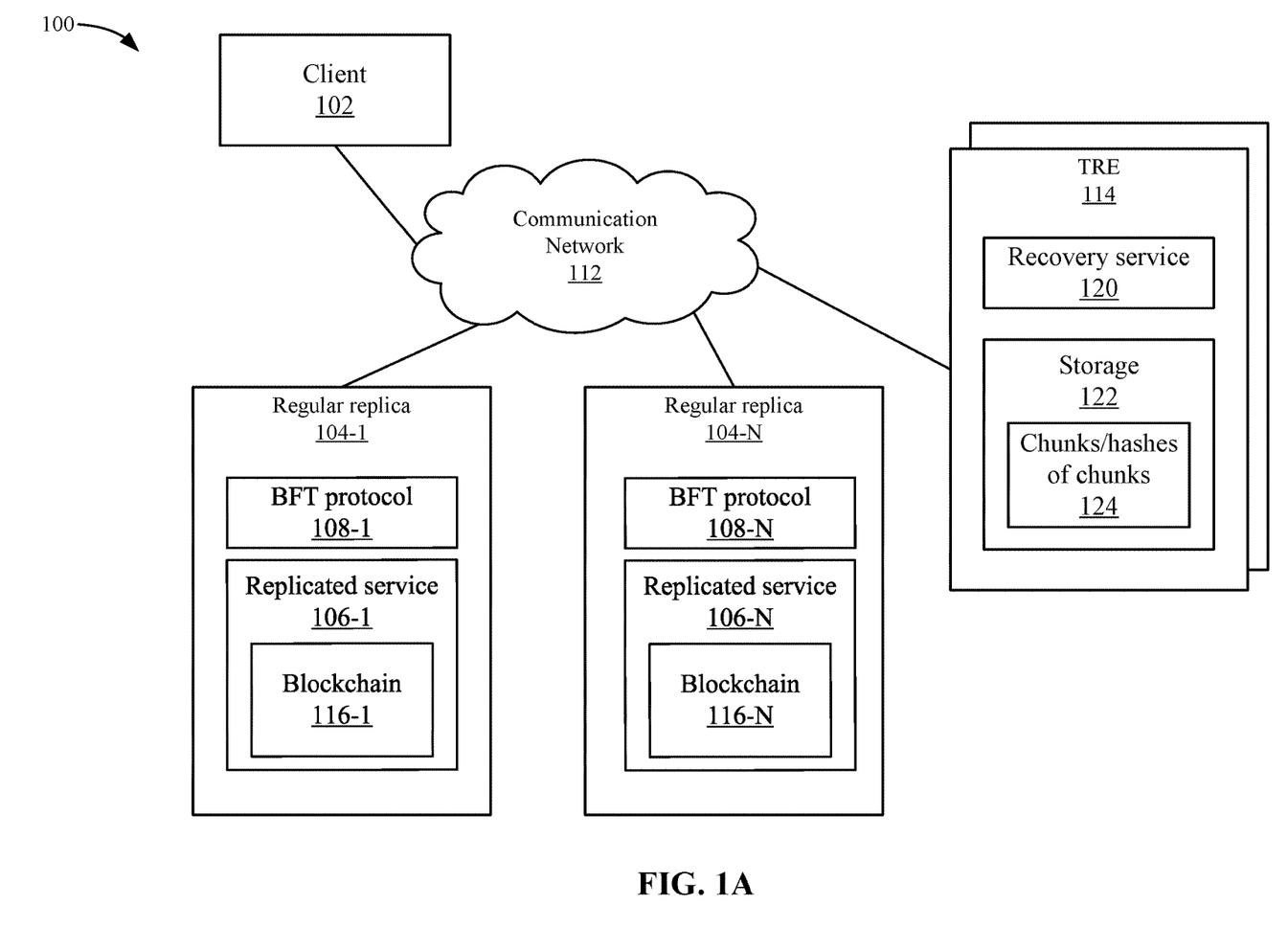
FIG. 1A depicts a system for implementing a state machine replication-based computing system according to some embodiments.

FIG. 1A depicts a system 100 for implementing a state machine replication-based computing system according to some embodiments. System 100 includes a client 102, N regular replicas 104-1, ..., 104-N (collectively referred to as regular replicas 104), and a traffic redundancy elimination (TRE) replica 114. Regular replicas 104 and TRE 114 may be interconnected via a communication network 112. Each regular replica 104 may be a physical or virtual machine that is configured to run an instance of a replicated service 106 (respectively replicated service 106-1, replicated service 106-2, ..., replicated service 106-N). An optimization of the recovery process may be performed by TRE 114. The optimization may remove redundancy when transferring blocks from a source replica to a recovering replica. As mentioned above, TRE 114 may only participate in the recovery process of the blockchain, but, in some cases, TRE 114 may be part of a regular replica 114 that participates in the consensus process. However, having TRE 114 be separate from a regular replica 114 may allow TRE 114 to be specially configured to perform the optimization described herein, such as TRE 114 may be configured with more memory to store chunks from blockchain 116. have more computing processing resources to perform the operations, and/or be able to transfer data faster. TRE 114 may be trusted in system 100. For example, cryptography may be used to communicate messages between TRE 114 and regular replicas 104. Different methods may be used to sign messages. For example, TRE 114 may include the public keys for regular replicas 104-1 to 104-N, which are used to verify the messages from regular replicas 104-1 to 104-N.

Examples of replicated service 106 include a blockchain service storage, a data storage service, etc. Client 102 consumes replicated service 106 by submitting requests for service transactions to a regular replica 104, such as primary replica 104 (e.g., the replica that coordinates the consensus process). In response, regular replicas 104 perform a consensus process to determine whether to commit and execute the request. The commitment of a transaction may indicate a consensus has been reached, such as quorum of regular replicas 104 has voted on or agreed on the proposal sent by a primary replica 104. Regular replicas 104 may then execute the transaction. Regular replicas 104 may update respective state of a blockchain 116 to reflect the results of the execution.

To ensure that regular replicas 104 sequence the execution of the transaction for the request submitted by client 102 in an identical fashion and thus maintain consistent service states, the state machine replication system may run a protocol on each regular replica 104, such as a BFT protocol (respective BFT protocols 108-1, 108-2, ..., 108-N). Examples of BFT protocols include practical BFT (PBFT), scalable BFT (SBFT), and other protocols. In one example of a protocol, in each view, one regular replica, referred as a primary regular replica, sends a proposal for a decision value (e.g., operation sequence number) to the other non-primary regular replicas and attempts to reach a consensus, such as 2F+1 regular replicas, to agree upon the proposal, where F is the maximum number of regular replicas that may be faulty. For brevity, every protocol message communicated between regular replicas may be digitally signed by the sender using cryptographic protocols and the receiver verifies the digital signature upon message receipt. Any one of a number of digital signature schemes may be used for this purpose, including threshold signatures or multi-signatures. Additionally, every message in the backup process described below may be digitally signed and verified.

In some embodiments, BFT protocol 108 is used to reach a consensus for storing blocks in a blockchain 116 in an agreed upon sequence. An instance of a blockchain 116, such as instances of blockchain 116-1 to 116-N, may be maintained by regular replicas 104-1 to 104-N, respectively. Blockchain 116 may be a storage record, such as a list of records or a ledger. The records may be referred to as blocks that may be linked together using cryptography. Each block may contain a cryptographic hash of the previous block, a timestamp, and transaction data. The timestamp is used to prove that the transaction data existed when the block was published to be used in the hash of the block. The blockchain may be used to maintain a ledger of transactions that are requested and performed. Although a blockchain is described, other entities that store data may be appreciated.

A number of transactions may be included in a block. The transactions may be key value pairs that represent data that is accessed in a key value store for the transaction, but other types of transactions may be appreciated. Messaging using BFT protocol 108 is used to agree on a sequence number for a block in blockchain 116. When consensus is reached, the block may be stored in blockchain 116 by regular replicas 104, and the transactions may be executed.

TRE 114 includes a recovery service 120 that is used when a state of blockchain 116 is being recovered by a recovering replica from a source replica. Recovery service 120 may perform an optimization on the transfer of blocks from blockchain 116. One optimization may be deduplication, which may reduce the redundant data that is sent between source replica and recovering replica as will be described in more detail below. TRE 114 includes storage 122, which can store chunks and hashes of chunks in a data structure 124. The chunks may be portions of blockchain 116, such as portions of blocks in blockchain 116. Each chunk may be associated with a respective representation of the chunk. The representation of the chunk may be smaller in size than the actual data in the chunks. For discussion purposes, hashes of chunks may be described, but other representations that are reductions in the size of chunks may be appreciated.

Figure 1B:
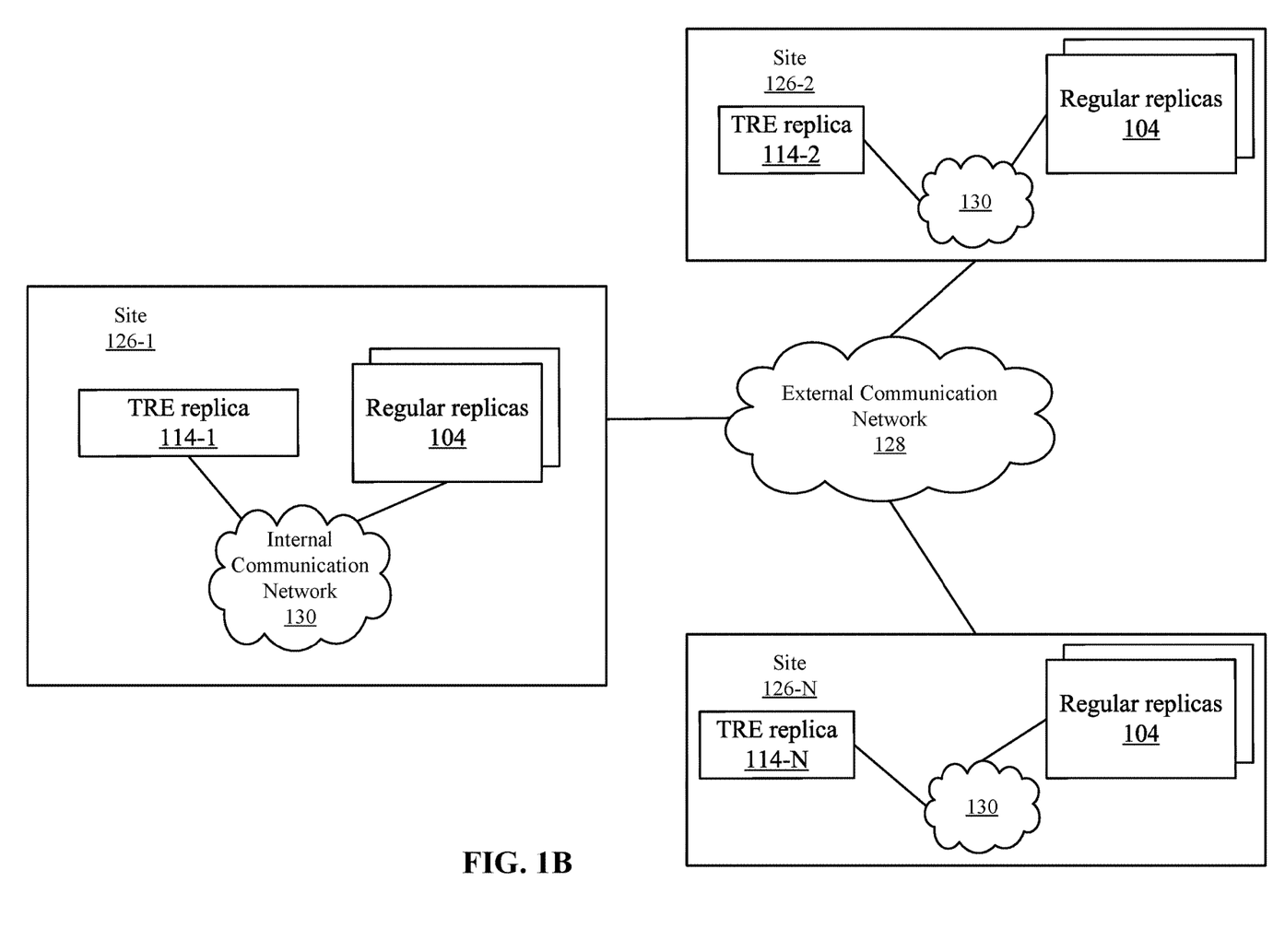
FIG. 1B depicts an example of different sites according to some embodiments.

Regular replicas 104 may be instantiated on computing devices in different sites. FIG. 1B depicts an example of different sites 126 according to some embodiments. Regular replicas 104 may be included in different sites 126-1, 126-2, . . . , 126-N. The sites may be data centers, portions of data centers, local area networks, etc. In some embodiments, a site may be determined based on different conditions. For example, sites may be in different physical locations, such as in different data centers. Also, a site may be in the same data center, but on different local area networks. A site may be managed by a provider, such as a public cloud provider and different sites 126 may be associated with the same cloud provider or different cloud providers.

Communication network 112 of FIG. 1 may include an internal communication network 130 and an external communication network 128. Communications within a site 126 may be performed using internal communication network 130. That is, communications do not go outside of site 126, but may use a local area network. A provider of site 126 may manage the internal communication network 130. When communicating between sites, such as between site 126-1 and site 126-2, communications may use external communication network 128, which routes data between sites 126. External communication network 128 may not be managed by the provider of sites 126, and may be a public network, such as the Internet, or another type of external network, such as a private network.

In some embodiments, an enterprise may be charged per communication between regular replicas 104. A first cost may be incurred when regular replicas 104 communicate within a site 126, and a second cost may be incurred when regular replicas 104 in one site 126-1 communicate with regular replicas 104 in another site, such as site 126-2. If the same amount of data and messages are sent, the second cost may be greater than the first cost because communicating via external communication network 128 may be charged at a higher rate than communicating via an internal communication network. Also, the congestion of networks within sites 126 and external communication network 128 may be different. For example, it may take longer to send data via external communications network 128 compared to sending data via an internal communication network 130. Also, internal communication network 130 may be congested and reducing the amount of traffic on its network may be beneficial to increase available bandwidth.

TREs 114 may be distributed across sites 126. For example, each site 126 may include a TRE 114, such as site 126-1 includes TRE 114-1, site 126-2 includes TRE 114-2, and site 126-N includes TRE 114-N. Not all sites 126 may include a TRE 114; however, having a TRE 114 may allow the optimization of data either within site 126 or sending data externally from site 126. Each respective TRE 114 may receive data traffic from regular replicas 104 within each respective site 126. For example, TRE 114-1 may receive data traffic from regular replicas 104 within site 126-1 during the recovery process. Also, TRE 114-2 may receive data traffic from regular replicas 104 within site 126-2. Each TRE 114 may optimize data traffic that is sent intra-site and/or also inter-site.

The following will describe the process to determine when a recovery process should be performed, and then describe the optimization of the recovery process.

State Transfer Service

A state transfer may be a mechanism that regular replicas 104 use to sync with other regular replicas 104. In the state transfer mechanism, regular replicas 104 may communicate between each other to determine when a recovery protocol should be entered to perform the recovery process. In this example, a recovering replica 104-1, and regular replicas 104-2 to 104-N are shown for discussion purposes. It is noted that recovering replica 104-1 may not be in the recovery process yet, but is named this for discussion purposes as it will be in the recovery process described later. Also, all regular replicas 104-1 to 104-N can communicate to perform the described process to determine when a recovery process should be entered.

Figure 2A:
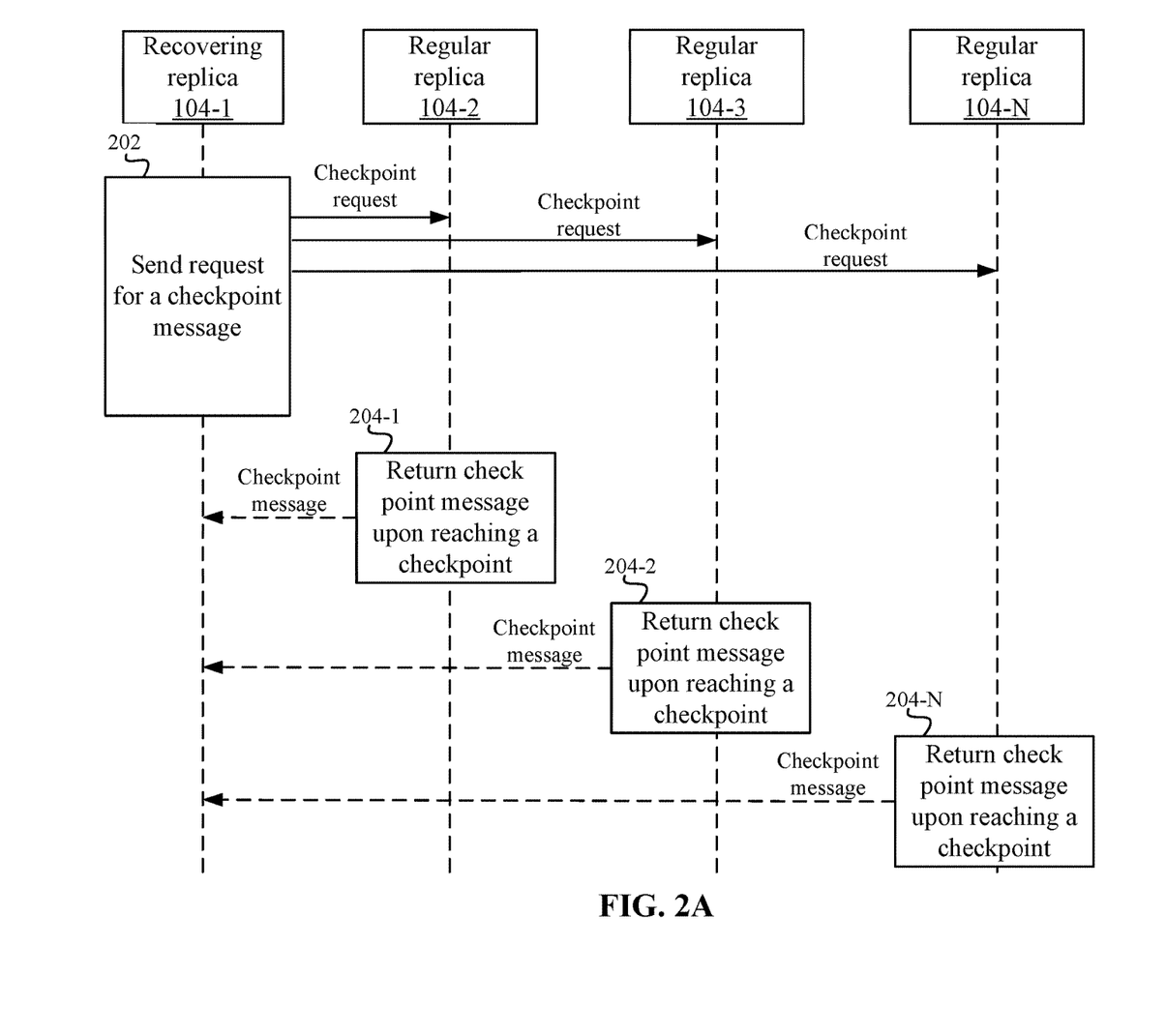
FIG. 2A depicts an example of requesting for checkpoint messages according to some embodiments.
Figure 2B:
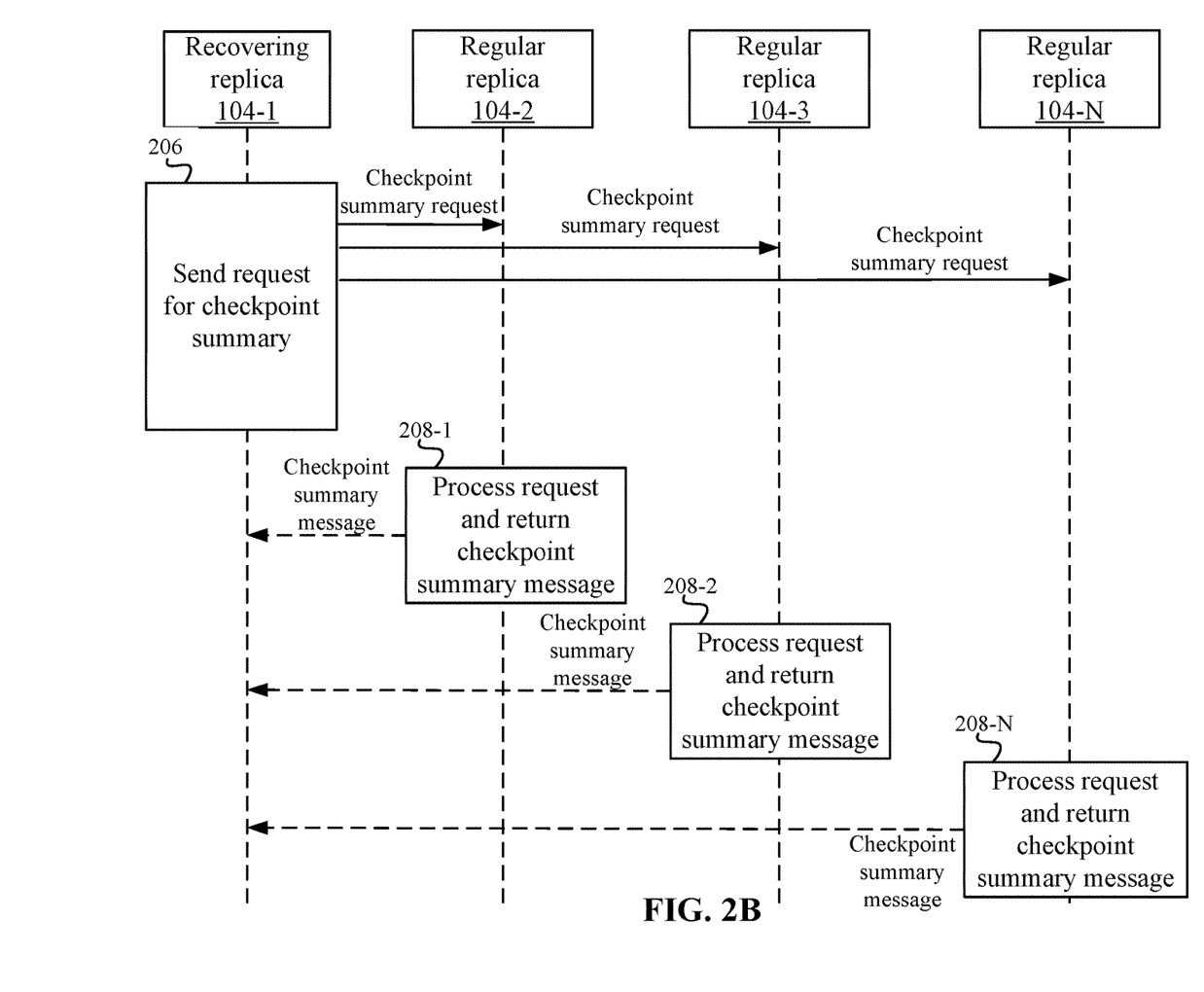
FIG. 2B depicts an example of collecting information for the recovery process according to some embodiments.

FIGS. 2A to 2B depict a flow for performing the state transfer service to determine whether to enter a recovery process according to some embodiments. The following process first determines when a checkpoint is reached in FIG. 2A. Then, the process determines if the recovery process should be run and sends requests for metadata for blocks that should be backed up in FIG. 2B.

Communication between regular replicas 104 may be used to determine when a stable checkpoint is reached. In some embodiments, checkpoints for blockchain 116 may be defined, which may be a number of blocks (e.g., a window) that have been committed to blockchain 116. For example, a checkpoint may be at every 150 blocks being committed to blockchain 116, such as at a block 150, block 300, block 450, etc. A stable checkpoint may be a checkpoint that is reached by at least a number of regular replicas, such as 2F+1 regular replicas. In some embodiments, the recovery process may be run when stable checkpoints are reached in blockchain 116. However, the recovery process may be run at other times, such as whenever a regular replica 104 determines that its blockchain is missing blocks, every block, every other block, etc.

FIG. 2A depicts an example of requesting for checkpoint messages according to some embodiments. Although requests for checkpoint messages may be described, they may not be sent. Rather, instead of waiting for a checkpoint request, each regular replica 104-2 to 104-N may return a checkpoint message when a checkpoint is reached without receiving a request. That is, recovering replica 104-1 does not need to send a checkpoint request to receive a checkpoint message. However, the process may be triggered when recovering replica 104-1 detects that blockchain 116-1 may require syncing, such as when corruption or loss of data occurs. At 202, a request for a checkpoint message is sent by recovering replica 104-1. The request for checkpoint message may be sent to other regular replicas 104-2 to 104-N to ask for a checkpoint message. That is, the request for a checkpoint message may request a checkpoint message be sent from regular replicas 104-2 to 104-N. It is noted that recovering replica 104-1 may send the described messages to itself also, and then respond to itself, but this detail is not described for brevity. The request may be sent on a time interval T, which may be any interval, such as every minute, number of minutes, etc.

Regular replicas 104-2 to 104-N may each receive the request for a checkpoint message. When the request for a checkpoint message is received, the message is processed by regular replicas 104-2 to 104-N to determine whether a checkpoint (e.g., a stable checkpoint) has been reached in blockchain 116. For example, if a block 150 is reached by 2F+1 regular replicas 104, then it is determined that a stable checkpoint has been reached. If a stable checkpoint is not reached, regular replica 104 may ignore the request for a checkpoint message and not send a checkpoint message back to recovering replica 104-1. Also, in other embodiments, a message indicating a stable checkpoint has not been reached may also be sent.

Upon reaching a stable checkpoint, as shown at 204-1 to 204-N, a checkpoint message may be returned by regular replicas 104-2 to 104-N. The checkpoint message may include information that describes the state of blockchain 116, such as a sequence number for the block associated with the checkpoint and information for the block associated with the checkpoint, such as a digest (e.g., hash) of a block (e.g., a hash of the last block, another block, and/or set of blocks). Each regular replica 104-2 to 104-N may return the checkpoint message based on the state of its own blockchain 116.

The checkpoint messages may be analyzed by recovering replica 104-1 to determine whether a number of regular replicas 104, such as F+1 regular replicas 104, reach consensus on providing the same information in the checkpoint message, such as the same sequence number and information for the block associated with the checkpoint. Depending on operating conditions, such as network conditions or if a regular replica 104 is operating slowly or failed, checkpoint messages may be received by one or more regular replicas 104 out of the N regular replicas 104. Recovering replica 104-1 may require that a number of regular replicas 104, such as at least F+1 regular replicas 104, to reach consensus on returning the same checkpoint message that includes the same sequence number and checkpoint block digest. This ensures that the checkpoint messages that are received can be trusted. For example, if consensus was not reached, a malicious actor may send a checkpoint message with malicious data. If consensus is not reached, recovering replica 104-1 may not proceed with the recovery process and may perform a remedial action, such as return an error. Other remedial actions may also be determined. The process may also continue to wait until other checkpoint messages are received.

If consensus is reached, such as F+1 checkpoint messages are received that are the same, the checkpoint messages are analyzed by recovering replica 104-1 to determine if a blockchain 116-1 needs to be updated. In some embodiments, blockchain 116 may be updated at stable checkpoints. For example, the last reachable block in blockchain 116 may be at block 150, and if a checkpoint message that is sent is at block 300, then blockchain 116 may need to be updated. A reachable block may be a block that is chained to the genesis block via consecutive blocks. However, if the checkpoint messages indicate that block 150 is the current block being stored at blockchain 116, then backup blockchain 116 may not need to be updated. Blockchain 116 may be recovered at any time, such as when data corruption occurs. The recovery may be up until the last known stable checkpoint.

If an update is not needed, then the process waits until another interval occurs where requests for checkpoint messages are sent and received. If an update does need to be performed, a recovery process is entered.

FIG. 2B depicts an example of collecting information for the recovery process according to some embodiments. At 206, requests for a checkpoint summary are sent by recovering replica 104-1. The request for a checkpoint summary may ask for a checkpoint summary message for identified blocks in blockchain 116-1, which may be the blocks that need to be recovered in blockchain 116-1. For example, recovering replica 104-1 may ask for checkpoint summaries from the block after the last stored checkpoint in blockchain 116-1. Also, a range of values may be requested, specific blocks may be requested, etc.

At 208-1 to 208-N, the request for the checkpoint summary is processed by regular replicas 104-2 to 104-N, which then return a checkpoint summary message. The checkpoint summary message may include information (e.g., metadata) for each block that has been requested. For example, if blocks 151-300 need to be recovered in blockchain 116-1, metadata for each of blocks 151-300 is sent in the checkpoint summary message. The information may allow each block to be identified and requested for transfer to recovering replica 104-1. For example, the information may include an identifier for each block, such as the sequence number of each block and other information, such as a hash of each block. The checkpoint messages are then processed.

In some embodiments, it may be determined if consensus is reached by receiving the same checkpoint summary messages from a number of regular replicas 104, such as F+1 regular replicas 104. For example, the information for the blocks is validated with a signature from each respective regular replica 104-2 to 104-N and it is determined if the same information is included for the blocks. If consensus is not reached, recovering replica 104-1 may not proceed with the backup process and perform a remedial action, such as return an error. The process may then wait for another interval in which requests for checkpoint messages are sent again as shown in FIG. 2A.

If consensus is reached, blocks that need to be requested in the recovery process are determined by recovering replica 104-1, such as a first block and a last block that need to be requested for blockchain 116-1. For example, all blocks may need to be recovered. Also, if blocks 151-300 need to be recovered, the first block may be 151 and the last block may be 300. Additionally, the blocks to request do not need to be contiguous.

Recovering replica 104-1 determines a source replica 104 (or more than one source replica 104) in which to request the blocks. The source replica(s) 104 may be determined in different ways. For example, source replica(s) 104 may be selected arbitrarily, based on current load, etc. In some embodiments, multiple source replicas 104 may be selected to send requests for blocks to reduce the load on one source replica 104. For example, 50 blocks may be retrieved from multiple source replicas 104.

Recovery Process

Figure 2C:
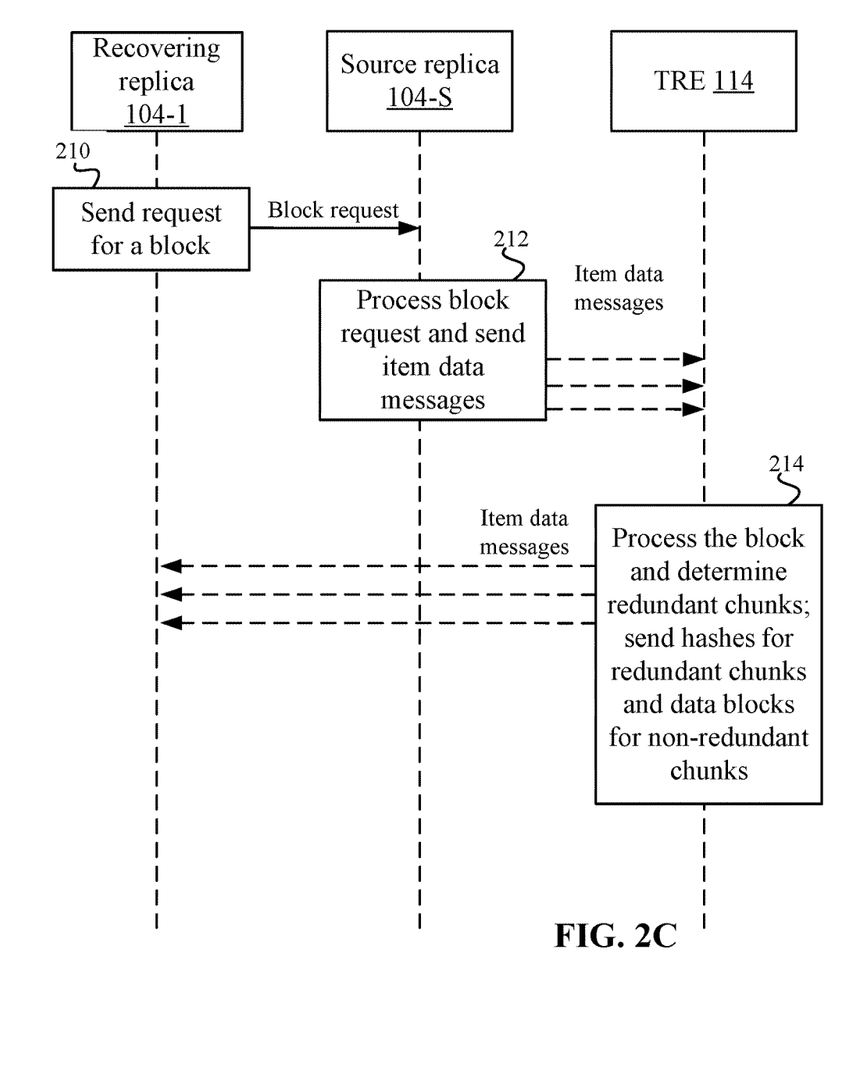
FIG. 2C depicts an example of performing the recovery process according to some embodiments.

FIG. 2C depicts an example of performing the recovery process according to some embodiments. Recovering replica 104-1 may select a source replica 104-S from regular replicas 104-2 to 104-N (the notation "104-S" may indicate that one or more of regular replicas 104-2 to 104-N are selected as the source replica). The selection of source replica 104-S may be performed based on different factors, such as which regular replicas 104-2 to 104-N are available, the load upon regular replicas 104-2 to 104-N, and other factors. Source replica 104-S may also be another type of replica that may be dedicated to performing a recovery of blockchain 116. For example, source replica 104-S may have backed up an instance of blockchain 116, and is dedicated to performing a recovery process (e.g., does not participate in the consensus process). Also, a TRE 114 is included in the recovery process, which may be within the same site 126 as source replica 104-S. Recovering replica 104-1 and source replica 104-S may be in the same site 126 or in different sites 126.

Once determining that recovery of one or more blocks is needed, at 210, recovering replica 104-1 sends a request for a block to source replica 104-S. Source replica 104-S processes the request for a block and determines data for the request, such as data for the block. Then, at 212, source replica 104-S sends item data messages that include the data for the block. One or more item data messages may be sent and include the data for the block. The item data messages may include information for data that is stored for the blocks of a respective blockchain 116 that is associated with source replica 104-1. For example, the item data messages include the transactions (e.g., key-value pairs), hash of the previous block, etc. In some examples, the item data messages may start from the last block that is referenced in the block request message and continue backwards until the first block is reached. This order may be used because blocks of blockchain 116 may be chained in the reverse order. For example, a block #300 may include a signed hash of block #249, block #249 may include a signed hash of block #248, and so on. A block (e.g., block #248) that is received can thus be verified using the signed hash from the previous block (e.g., block #249) that has been received by comparing the hash of block #248 that is received to the hash included in the block #249. Also, cryptography may be used by source replica 104-S to authenticate that the item data messages are from source replica 104-S, such as the item data messages may be signed by the key associated with source replica 104-S.

The item data messages may be addressed to recovering replica 104-1. However, TRE 114 may receive the item data messages. Various methods may be used to insert TRE 114 in between the messaging between recovering replica 104-1 and source replica 104-S. For example, TRE 114 may be a proxy for source replica 104-S and the item data messages are re-directed to TRE 114.

At 214, TRE 114 processes the data in the block from the item data messages, and determines redundant chunks for the block. Then, TRE 114 sends hashes for the redundant chunks in item data messages. For the non-redundant chunks, TRE 114 sends the actual data for the chunks in item data messages to recovering replica 104-1. Also, TRE 114 may include the signature from source replica 104-S. In this case, recovering replica 104-1 can validate the item data messages are from source replica 104-S. Further, recovering replica 104-1 may not know that TRE 114 processed the item data messages from the source replica 104-S; rather, recovering replica 104-1 may believe the item data messages are from source replica 104-S.

The following will now describe the processing at TRE 114 in more detail.

Deduplication Process

Figure 3:
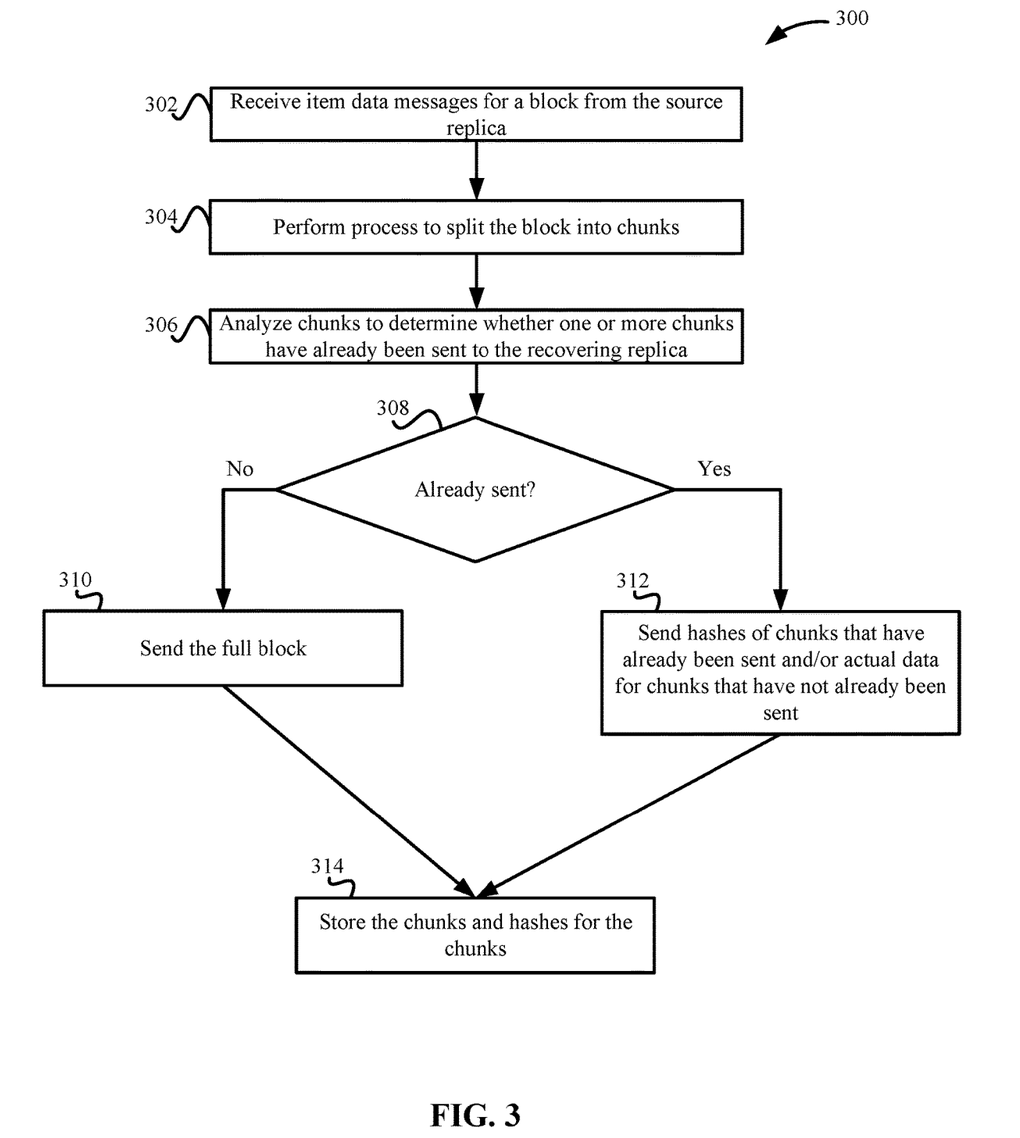
FIG. 3 depicts a simplified flowchart of a method for analyzing blocks at a traffic redundancy elimination (TRE) replica according to some embodiments.

FIG. 3 depicts a simplified flowchart of a method for analyzing blocks at TRE 114 according to some embodiments. At 302, item data messages are received from source replica 104-S at TRE 114. The item data messages may be data for a block. At 304, a process is performed by TRE 114 to split the block into chunks. Different methods may be used to split the block into chunks. For example, a fixed amount of data may be used for each chunk. Also, the data in the block may be analyzed to determine where to split the block. For example, algorithms may be used to determine patterns of data in the blocks to dynamically adjust block size.

At 306, chunks are analyzed by TRE 114 to determine whether one or more chunks can be retrieved by recovering replica 104-1 using a hash of the chunk without sending the actual data for the chunk. There may be different ways recovering replica 104-1 may be able to retrieve a chunk using the hash. For example, there may be different ways recovering replica 104-1 may be able to retrieve a chunk using a hash of the chunk. For example, the hashes may be used per recovery process session, such as only during the current recovery process session between recovering replica 104-1 and source replica 104-S. As discussed above, the blockchain may include data in multiple blocks that has not changed. Accordingly, it may be likely that a previous block in blockchain 116 that was sent in the recovery process session included a chunk of data that is the same as a chunk of data found in the current block or a chunk found in the same block. When a recovery process session starts between recovering replica 104-1 and source replica 104-S, TRE 114 may store chunks and corresponding hashes for the chunks in storage 122. TRE 114 may maintain the storage of the chunks and hashes while the recovery process session is in progress between recovering replica 104-1 and source replica 104-S. After the recovery process has completed, the chunk and the hashes may be deleted. There may be other ways recovering replica 104-1 may be able to retrieve a chunk using a hash of the chunk. For example, information from another recovery process session may be used. If recovering replica 104-1 had previously performed a recovery process, the chunk may have been sent in the previous recovery process and stored. The hash for that chunk may be used. However, it is possible that recovering replica 104-1 may not have the actual chunks and hashes stored after a recovery process has finished due to corruption or the clearing of memory. If a hash is sent that cannot be used to retrieve the chunk, recovering replica 104-1 may communicate with TRE 114 or source replica 104-S to request the chunk again without sending a hash. Accordingly, the process may be performed per session or may be persistent across sessions. Further, if multiple recovering replicas 104 are performing recovery processes, there may be centralized storage of chunks that can be accessed during the recovery process. For example, another TRE 114 at the destination site may store data for the chunks that are sent during recovery processes with recovering replicas 104 in the destination site. The TRE 114 at the destination site may be used to retrieve chunks using hashes of the chunks. Accordingly, different methods may be used to determine whether a hash may be used.

At 308, it is determined whether the chunks can be retrieved by recovering replica 104-1. For example, TRE 114 may generate a hash for each of the chunks sent in the item data messages, and look up in storage 122 whether the hash is stored for a chunk that has already been sent to recovering replica 104-1. If an identical hash is found, then the hash may be sent by TRE 114. For hashes of chunks that are not found, then the actual data for the chunks is sent. If no chunks have already been sent for the block, then at 310, the full block is sent by TRE 114. For example, the item data messages that include the data for the chunks of the block are sent. These item data messages include the signature of source replica 104-S. In some embodiments, the original item data messages may be forwarded by TRE 114 to recovering replica 104-1. If some chunks can be retrieved by recovering replica 104-1, at 312, hashes of these chunks may be sent. For example, an entry in storage 122 includes the hash of the chunk, which means that recovering replica 104-1 has access to the data of the chunk because the data for the chunk was already sent to recovering replica 104-1. Accordingly, different combinations of hashes of chunks and actual chunks may be sent. For example, if a block includes the exact same data as the previous block except for one chunk, then the hashes for all but one chunk may be sent. TRE 114 may send the item data messages directly to recovering replica 104-1 without going through source replica 104-S. However, TRE 114 may send the item data messages back to source replica 104-2 or to another entity for forwarding to recovering replica 104-1.

At 314, the chunks and the hashes for the chunks are stored in storage 122 by TRE 114. This maintains a record of the chunks that have been sent for the recovery process. The record of the chunks may reference the recovering replica 104-1 and source replica 104-S that participated along with any other information that may be used to identify the current recovery process session. This storage is checked by recovering replica 104-1 when data for another chunk/block is received, and the process in FIG. 3 is repeated again.

Recovering Replica Process

Figure 4:
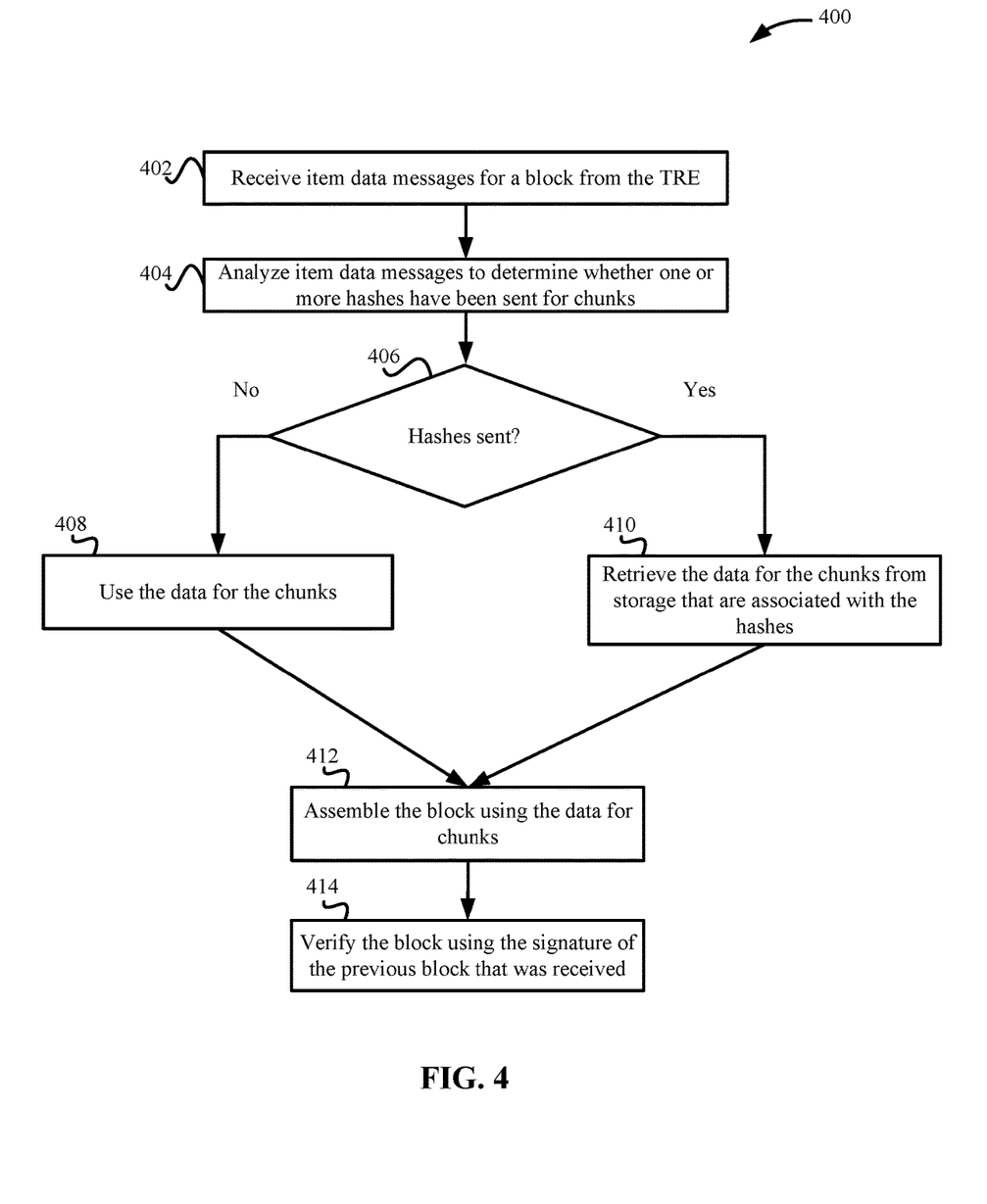
FIG. 4 depicts a simplified flowchart of a method for recovering blocks in a blockchain at a recovering replica according to some embodiments.

FIG. 4 depicts a simplified flowchart 400 of a method for recovering blocks in blockchain 116 at recovering replica 104-1 according to some embodiments. At 402, recovering replica 104-1 receives item data messages for a block that were sent from TRE 114. As discussed above, recovering replica 104-1 may authenticate the item data messages by validating the signature from source replica 104-S that is included with the item data messages. At 404, source replica 104-S analyzes the item data messages to determine whether one or more hashes have been sent for chunks. The hashes may be identified using different methods. For example, the format of the data may be analyzed to determine whether a hash or data for a block has been sent, the length of the data (e.g., hashes may be shorter than chunks). Information, such as a flag, may be set indicating hashes have been sent, or other identification methods may be used.

At 406, if hashes have not been sent, at 408, source replica 104-S uses the data chunks for the block. If hashes have been sent, at 410, the data chunks for the hashes are retrieved from storage by source replica 104-6. For example, the hash value may be used to look up the actual data for the chunk in storage, such as the previously sent chunks may be stored in local storage at recovering replica 104-1. Then, recovering replica 104-1 may retrieve the corresponding chunk using the hash. Alternatively, recovering replica 104-1 may communicate with a local TRE 114 or external storage to retrieve the chunk. For example, recovering replica 104-1 may access centralized storage.

At 412, the block is assembled using the data chunks. For example, if a combination of actual data for the chunks and hashes is received, the data for the chunks that are associated with the hashes may then be combined with the data for the chunks that is received in the item data messages to assemble the block. The sequence of the chunks may be maintained using sequence identifiers for the chunks that indicate where to insert the chunks to recreate the original block.

At 414, the block is verified once it is re-created. For example, the signature of the previous block that was received may be used to verify the content of the current block. As mentioned above, each block may contain a cryptographic hash of the previous block. That is, block 151 contains a cryptographic hash of block 150. Block 151 is sent first in the recovery process. Then, when block 150 is received, it can be verified by recovering replica 104-1 using the hash of block 150 that is found in block 151 by comparing the hashes. Accordingly, if the hash of the current block equals the hash that is included in the previous block, then the current block is verified. The above process continues until all blocks are recovered. As noted above, if a hash is not found, then recovering replica 104-1 may send a message asking for the actual data for a block instead of a hash.

CONCLUSION

Accordingly, using TRE 114 allows a reduction in the amount of data that is sent during a recovery process. This improves the bandwidth that is used in the recovery process. Further, it may reduce costs when an enterprise is charged for transfer of data either intra-site or inter-site.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. Various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents may be employed without departing from the scope of the disclosure as defined by the claims.

What is claimed is:

1. A method comprising:
   receiving, by a computing device, data for a block in a blockchain during a recovery process, wherein in the recovery process a recovering replica is recovering the block for a first instance of the blockchain, wherein the first instance of the blockchain is being maintained by the recovering replica, and wherein the block is received from a second instance of the blockchain being maintained by a source replica;
   splitting, by the computing device, the data for the block into a plurality of chunks, wherein each chunk includes a portion of the data for the block;
   determining, by the computing device, whether the recovering replica can recover a chunk in the plurality of chunks using a representation of the chunk;
   in response to determining that the recovering replica can recover the chunk using the representation of the chunk, sending, by the computing device, the representation of the chunk to the recovering replica; and
   in response to determining that the recovering replica cannot recover the chunk using the representation of the chunk, sending, by the computing device, the data for the chunk to the recovering replica.

2. The method of claim 1, wherein receiving the data for the block comprises:
   receiving, from the source replica, a set of messages that include the data for the block, wherein the set of messages are addressed to the recovering replica, and wherein the set of messages were redirected to the computing device.

3. The method of claim 1, wherein:
   the data for the chunk is received in a first set of messages, wherein the first set of message are sent from the source replica,
   the first set of messages include a signature of the source replica; and
   the representation of the chunk or the data for the chunk is sent to the recovering replica in a second set of messages, wherein the second set of messages include the signature of the source replica.

4. The method of claim 1, wherein splitting the data into chunks comprises:
   analyzing the data to determine a chunk size to split the data for the chunk.

5. The method of claim 1, wherein determining whether the recovering replica can recover the chunk using the representation of the chunk comprises:
   determining whether the data for the chunk has been previously sent to the recovering replica.

6. The method of claim 1, wherein:
   a combination of one or more representations for chunks and first data for chunks is sent for the block, and
   the combination allows the recovering replica to recover the block by:
      retrieving second data for chunks using the one or more representations for the chunks, and
      combining the first data with the second data to recover the block.

7. The method of claim 1, further comprising:
   storing the representation for the chunk, wherein the representation for the chunk is used to determine whether the recovering replica can recover the chunk using the representation of the chunk when another block is received.

8. A non-transitory computer-readable storage medium containing instructions, that when executed, control a computing device to be operable for:
   receiving data for a block in a blockchain during a recovery process, wherein in the recovery process a recovering replica is recovering the block for a first instance of the blockchain, wherein the first instance of the blockchain is being maintained by the recovering replica, and wherein the block is received from a second instance of the blockchain being maintained by a source replica;
   splitting the data for the block into a plurality of chunks, wherein each chunk includes a portion of the data for the block;
   determining whether the recovering replica can recover a chunk in the plurality of chunks using a representation of the chunk;
   when the recovering replica can recover the chunk using the representation of the chunk, sending the representation of the chunk; and
   when the recovering replica cannot recover the chunk using the representation of the chunk, sending the data for the chunk.

9. The non-transitory computer-readable storage medium of claim 8, wherein receiving the data for the block comprises:
   receiving, from the source replica, a set of messages that include the data for the block, wherein the set of messages are addressed to the recovering replica, and wherein the set of messages were redirected to the computing device.

10. The non-transitory computer-readable storage medium of claim 8, wherein:

the data for the chunk is received in a first set of messages, wherein the first set of message are sent from the source replica, the first set of messages include a signature of the source replica; and the representation of the chunk or the data for the chunk is sent to the recovering replica in a second set of messages, wherein the second set of messages include the signature of the source replica.

11. The non-transitory computer-readable storage medium of claim 8, wherein splitting the data into chunks comprises:

analyzing the data to determine a chunk size to split the data for the chunk.

12. The non-transitory computer-readable storage medium of claim 8, wherein determining whether the recovering replica can recover the chunk using the representation of the chunk comprises:

determining whether the data for the chunk has been previously sent to the recovering replica.

13. The non-transitory computer-readable storage medium of claim 8, wherein:

a combination of one or more representations for chunks and first data for chunks is sent for the block, and the combination allows the recovering replica to recover the block by:

retrieving second data for chunks using the one or more representations for the chunks, and combining the first data with the second data to recover the block.

14. The non-transitory computer-readable storage medium of claim 8, further operable for:

storing the representation for the chunk, wherein the representation for the chunk is used to determine whether the recovering replica can recover the chunk using the representation of the chunk when another block is received.

15. An apparatus comprising:

one or more computer processors; and a non-transitory computer-readable storage medium comprising instructions, that when executed, control the one or more computer processors to be operable for:

receiving data for a block in a blockchain during a recovery process, wherein in the recovery process a recovering replica is recovering the block for a first instance of the blockchain, wherein the first instance of the blockchain is being maintained by the recovering replica, and wherein the block is received from a second instance of the blockchain being maintained by a source replica;

splitting the data for the block into a plurality of chunks, wherein each chunk includes a portion of the data for the block;

determining whether the recovering replica can recover a chunk in the plurality of chunks using a representation of the chunk;

when the recovering replica can recover the chunk using the representation of the chunk, sending the representation of the chunk; and when the recovering replica cannot recover the chunk using the representation of the chunk, sending the data for the chunk.

16. The apparatus of claim 15, wherein receiving the data for the block comprises:

receiving, from the source replica, a set of messages that include the data for the block, wherein the set of messages are addressed to the recovering replica, and wherein the set of messages were redirected to the apparatus.

17. The apparatus of claim 15, wherein:

the data for the chunk is received in a first set of messages, wherein the first set of message are sent from the source replica, the first set of messages include a signature of the source replica; and the representation of the chunk or the data for the chunk is sent to the recovering replica in a second set of messages, wherein the second set of messages include the signature of the source replica.

18. The apparatus of claim 15, wherein splitting the data into chunks comprises:

analyzing the data to determine a chunk size to split the data for the chunk.

19. The apparatus of claim 15, wherein determining whether the recovering replica can recover the chunk using the representation of the chunk comprises:

determining whether the data for the chunk has been previously sent to the recovering replica.

20. The apparatus of claim 15, wherein:

a combination of one or more representations for chunks and first data for chunks is sent for the block, and the combination allows the recovering replica to recover the block by:

retrieving second data for chunks using the one or more representations for the chunks, and combining the first data with the second data to recover the block.

21. The apparatus of claim 15, further operable for:

storing the representation for the chunk, wherein the representation for the chunk is used to determine whether the recovering replica can recover the chunk using the representation of the chunk when another block is received.

* * * * *